United States Patent [19]

Hoshino et al.

[11] Patent Number: 4,850,258

[45] Date of Patent: Jul. 25, 1989

[54] SNARE DRUM HEAD WITH ODD NUMBER OF ATTACHMENT BOLTS

[75] Inventors: Yoshihiro Hoshino, Nagoya; Taisei Sugiyama, Shizuoka, both of Japan

[73] Assignee: Hoshino Gakki Co., Ltd., Japan

[21] Appl. No.: 292,778

[22] Filed: Jan. 3, 1989

[30] Foreign Application Priority Data

May 16, 1988 [JP] Japan ........................ 63-64303[U]

[51] Int. Cl.[4] ........................ G01D 13/02

[52] U.S. Cl. ........................ 84/413; 84/415

[58] Field of Search ........................ 84/411, 413, 415, 416, 84/417

[56] References Cited

U.S. PATENT DOCUMENTS

| | | | |
|---|---|---|---|
| 365,817 | 7/1887 | Johnson | 84/413 X |
| 390,469 | 10/1888 | Foley et al. | 84/413 |
| 416,327 | 12/1889 | Durkee | 84/411 R |
| 1,236,667 | 8/1917 | Bower | 84/415 |
| 1,290,823 | 1/1919 | Wintrich | 84/411 R |
| 1,335,867 | 4/1920 | Walton | 84/413 |
| 4,428,272 | 1/1984 | Andre et al. | 84/413 |

*Primary Examiner*—Lawrence R. Franklin

*Attorney, Agent, or Firm*—Ostrolenk, Faber, Gerb & Soffen

[57] ABSTRACT

For a snare drum, the drum heads at the ends of the drum body are secured to the drum body by respective drum hoops. The hoop at the beating end of the drum body is attached to the drum body by an odd number of attaching bolts that extend between the hoop and attachment fixtures on the side of the drum body, whereby the tension lines across the beaten drum head do not pass through the center of the drum head, but instead surround and define a polygonal area. The opposite drum head hoop is held by an even number of bolts and attachment fixtures on the drum body, whereby the tension lines on the second drum head pass through the center of the second drum head. A second wire or a plurality of sound wires in the form of a snappy is attached to the drum body and extends across the underside of the opposite drum head.

11 Claims, 4 Drawing Sheets

SNARE DRUM HEAD WITH ODD NUMBER OF ATTACHMENT BOLTS

BACKGROUND OF THE INVENTION

The present invention relates to the securement of the drum head to a snare drum.

A snare drum has a drum head which the musician beats. The snare drum may also have a snappy which is equipped with a number of sound wires and is installed in a freely switchable manner on the drum head surface that is on the opposite end of the drum body from the beaten drum head. A snappy is used for producing a drum sound which is bright and clear. The vibrations of the drum head on the beaten surface are transmitted to the sound wires through the vibrations of the drum head on the reverse side.

Each snare drum head is conventionally installed and stretched on the drum trunk or drum body by means of a hoop that is placed around the drum body near the end on which the drum head is installed. The hoop engages a rib around the periphery of the drum head material. The hoop is drawn down the side of the drum body, and this pulls upon the drum head rib and tightens the drum head. The hoop is in turn secured to the drum body by a series of attachment means arrayed around the drum body and attached to the hoop. Those attachment means are typically bolts extending between attachment elements on the drum body and bolt receptacles defined in or nuts at the hoop.

Typically, there are an even number of attachment means or bolts, e.g. ten bolts, disposed uniformly spaced around each drum hoop, and typically the same number of attachment and tightening bolts are used both for the beaten drum head and the opposite drum head. Securement of the drum head with an even number of tightening bolts, which are equally spaced apart and which equally divide the outer periphery of the drum head, also causes at least one pair and usually many or even all of the pairs of the attachment and tightening bolts to be diametrically opposite each other. A line between any pair of opposite bolts passes through the center of the drum head along a diameter. When one such tightening bolt is tightened, as is done for the purpose of tuning that drum head, a tension line is formed along the diameter reaching the opposite tightening bolt through the center of the drum head. Opposite pairs of tightening bolts produce a number of diametrically arranged intersecting tension lines all going through the center of the drum head. Thus 2n tightening bolts can generate up to n tension lines, which is the number of the intersecting diameters.

For a conventional drum with an even number of tightening bolts, the tightening of the bolts in connection with tuning will be carried out in a straight line between two bolts along a diameter. This makes it difficult to achieve a balanced adjustment of the tension of the head surface as a whole. Furthermore, because the crossing point of tension lines is formed at the center of the drum head, this applies a strong tension on this part. During heating of the drum head, it becomes difficult for sound to be produced or the sound becomes strained, thereby producing a "thin" or unrealistic sound.

Since the drum head is in essence divided into a number of pie shaped sections each outlined by diametric lines that pass through the center, each diametric line becomes a "knot" line, making it easier for a special vibration mode to be established, which is liable to be produced in the vibration form of the drum head and produces a lingering tone, which is noise, without producing a basic tone.

SUMMARY OF THE INVENTION

It is the object of the present invention to enable the beaten drum head to have more balanced, less concentrated tension over the surface of the drum head, especially after tuning the drum head or tension adjustment for reproducing a more accurate and powerful drum sound with its fundamental sound at the center.

Another object of the present invention is to enable the drum head at the opposite end of the drum body, which is equipped with sound wires, to experience satisfactory response of the sound wires.

In the invention, a snare drum has a drum body or drum trunk over which the drum head that will serve as the beating surface is installed. The drum head has a rib around its periphery by which it is engaged to be stretched over the end of the body. The drum hoop around the drum body toward the one end engages the drum head rib and the hoop is drawn toward the other end of the drum body. The hoop is attached by a plurality of attachment means extending from the drum hoop to the side wall of the drum body. These attachment means typically comprise bolts extending from respective fixtures on the drum body to bolt receptacles on the hoops, which receptacles may be threaded, or nuts secure the bolts to the hoop.

In the invention, the hoop for the beaten drum head is drawn down the drum body by means of an odd number, e.g. eleven, of attachment means or tightening bolts that are equally spaced around the periphery of the drum head.

The drum head on the opposite end of the drum body is held by its respective hoop and attachment means. That drum head may serve as a sound wire or snappy installation surface. That drum head is installed on the drum body by an even number of attachment means or tightening bolts that are equally spaced around the periphery of that drum head.

An odd number of tightening bolts are provided on the beaten drum head and are arranged so that no two bolts are along a diametric line that passes through the center of the drum head. As a result, the tension on the beaten drum head is dispersed along the respective lines that connect each pair of bolts, and those lines are all located at the right and left of the diameters and pass outside the center, thereby forming approximately pie shaped areas. In addition, each bolts forms a respective dispersed tension line between itself and the other bolts. This products a "star" shape tension line arrangement having the same number of angles as the number of bolts. The foregoing makes it possible for the entire drum head to be tuned. Because there is no single crossing point of all of the tension lines, a polygonal shaped tensioned area is formed around the center of the drum head. Improved elasticity is produced at the surface of the drum head producing a high quality reliable sound.

In contrast, because the sound wires are installed along a diametric line across the drum head on the opposite end of the drum body and because the tension lines cross generally at the center of the drum head through use of an even number of tightening bolts, the response of the sound wires becomes better and their tone becomes more brilliant.

Other objects and features of the present invention will become apparent from the following description of preferred embodiments of the invention considered in conjunction with the accompanying drawings.

DETAILED DESCRIPTION OF THE INVENTION

Figure 1:
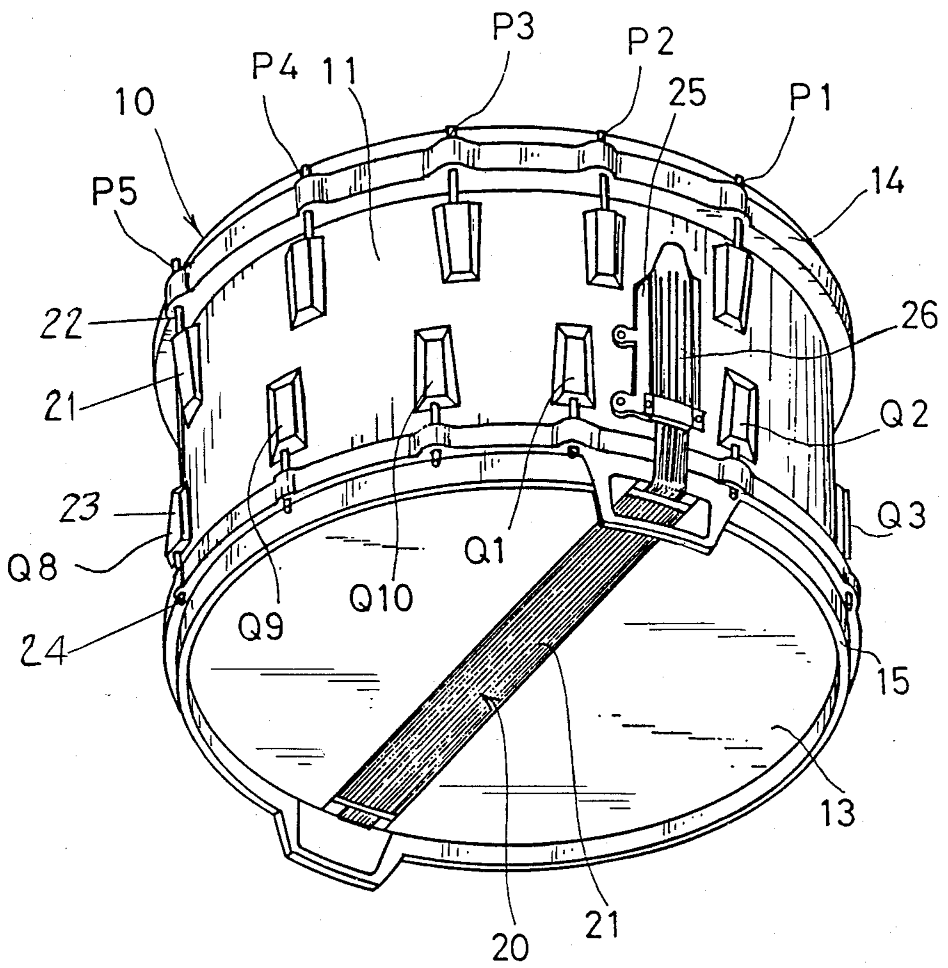
FIG. 1 is a bottom perspective view of a snare drum of the invention.
Figure 2:
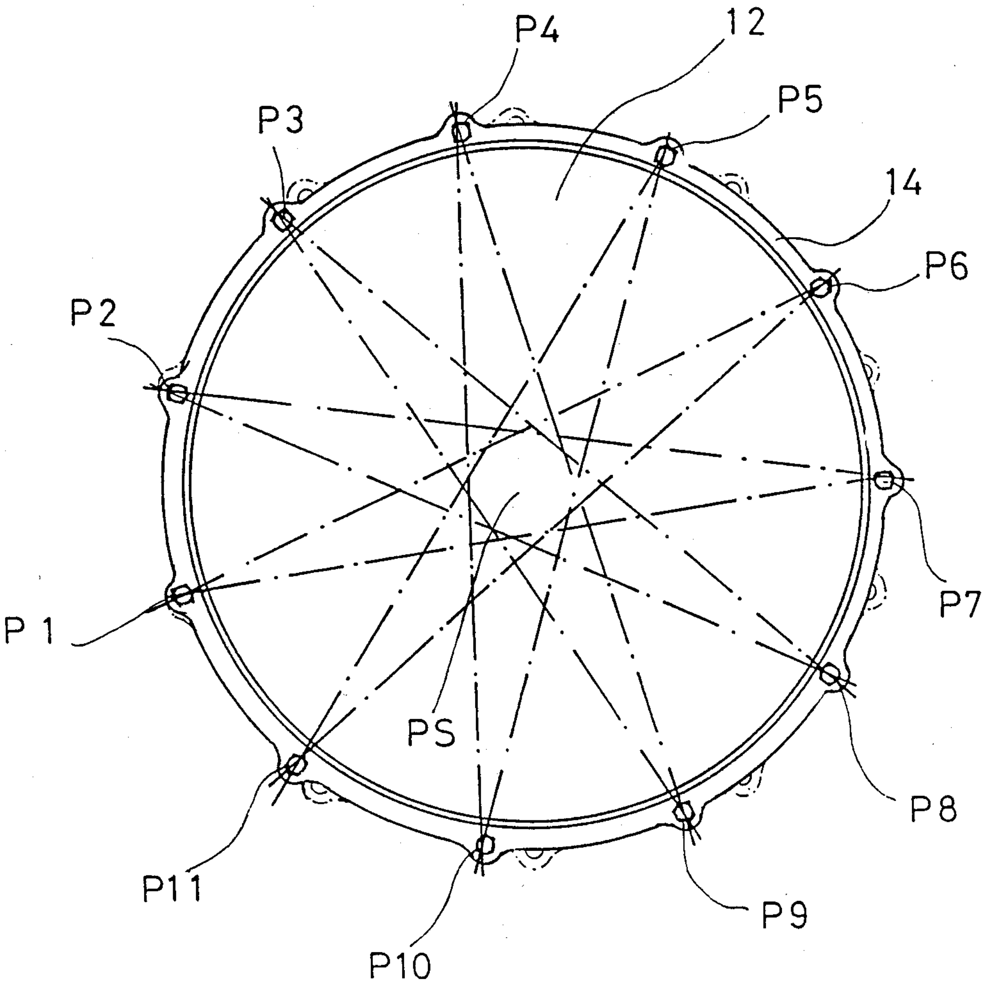
FIG. 2 is a plan view of the upper, beaten drum head and of the drum head attachment means on the upper end of the snare drum.
Figure 3:
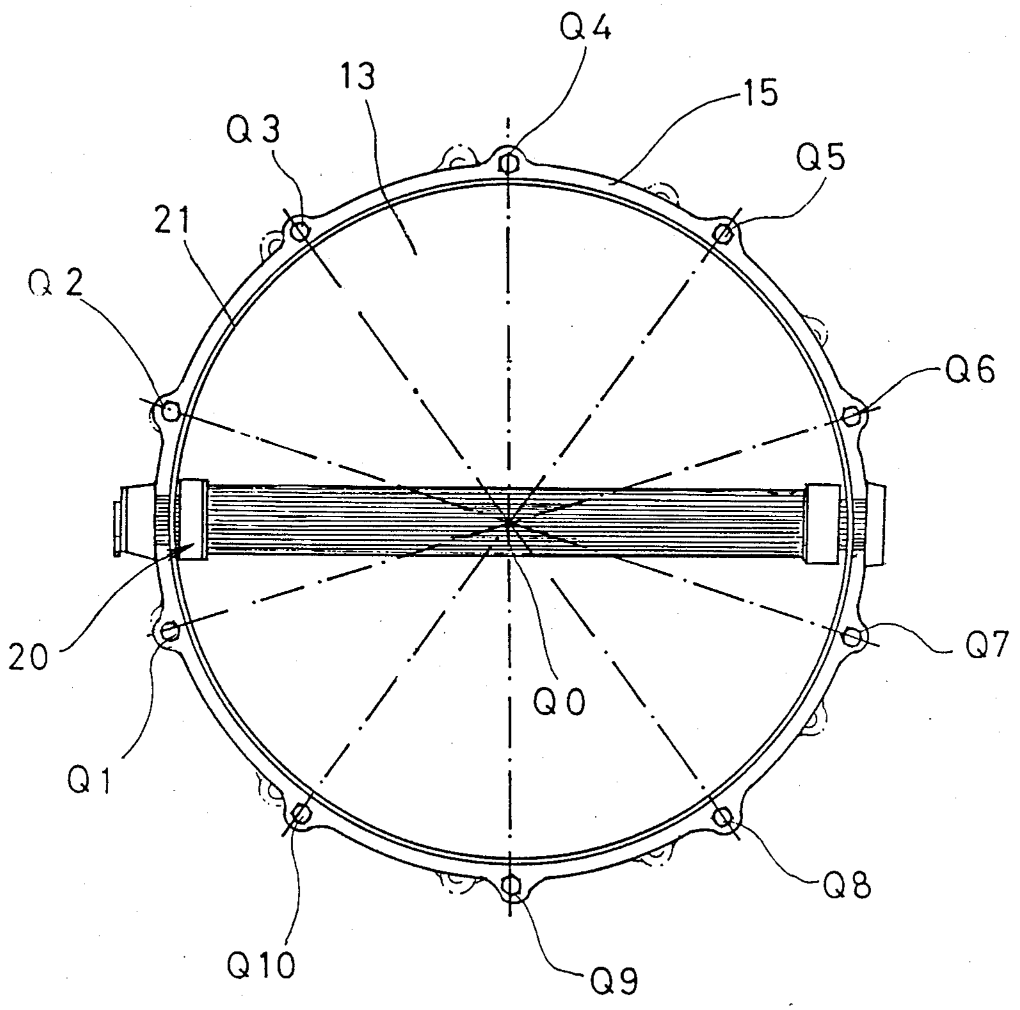
FIG. 3 is a plan view of the bottom of the drum showing the attachment means of that drum head.

Referring to FIGS. 1 through 3, the snare drum of this invention has an upper drum head 12 that is the beaten surface of the drum and has a lower drum head 13 on the opposite end of the drum body from the beaten surface that serves as a sound transmitting surface.

The beaten drum head 12 is installed over the upper end of the drum body and is stretched by an upper drum hoop 14 located near the upper end of the drum body. The hoop is attached to the drum body by an odd number of attachment means, which comprise tightening bolts P1, P2, P3, P4, P5, . . . P11. Eleven bolts are suggested that are equally spaced around the periphery of the drum head.

For attaching the drum head 12, the attachment means further comprise a plurality of attachment fixtures 21 on the drum body near the top end but below the hoop 14. Each fixture supports a respective bolt P. In the hoop 14, there are respective bolt attachment receptacles 22 in the form of threaded openings into which the bolts P may be tightened. Alternatively, a respective nut may be screwed onto the end of each bolt and may be turned down to the hoop to tighten the bolt. Each attachment receptacle 22 on the hoop is above and arrayed over a respective attachment fixture 21 on the drum body so that the connecting bolts P can join them and pull the hoop 14 down along the drum body to stretch and tighten the drum head 12.

The drum head 13 installed over the opposite end of the drum body is stretched by a lower hoop 15 located near the lower end of the drum body. The hoop 15 is attached to the drum body by an even number of attachment means comprising tightening bolts Q1, Q2, Q3, Q4, Q5, Q6, . . . Q10. Ten bolts are suggested. The bolts are equally spaced around the hoop and the periphery of the lower drum head. Like the connection of the upper drum head to the drum body, there are lower attachment fixtures 23 on the drum body above the hoop 15. For each fixture 23, there is a respective attachment bolt receptacle 24 on the lower hoop 15 so that tightening of the bolts Q draws the hoop 15 up the drum body to stretch and tighten the lower drum head 13.

In FIG. 1, a snappy 20 comprising sound wires 21 is conventionally secured across the lower drum head 13. A switch side extension 25 of the snappy carries switch 26 by which the snappy is selectively tightened over the drum head or loosened.

The dash-dot lines in FIGS. 2 and 3 indicate the paths of the tightening forces when each tightening bolt is tightened, defining the so called tension lines.

Figure 4:
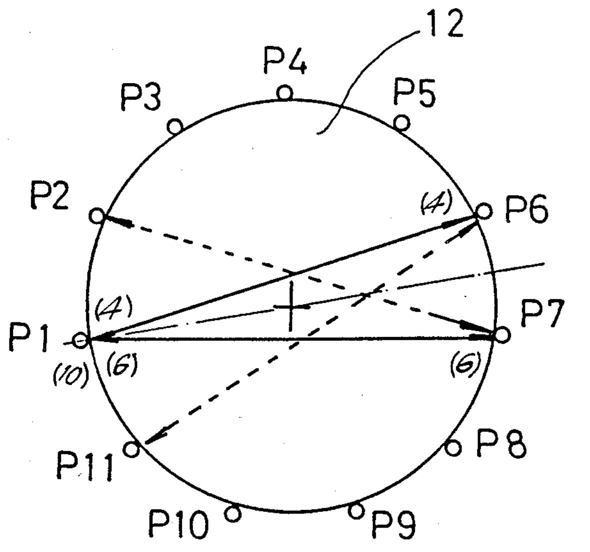
FIG. 4 is a schematic view showing the tension lines where the hoop for the beaten drum head is attached by means of an odd number of bolts.

With an odd number of tightening bolts stretching the beaten drum head 12, as shown in FIGS. 2, the increased tension when any one bolt is tightened is dispersed to two lines that connect that one bolt to two other bolts which are located both at the right and left of the diametric line from that tightened bolt. Examples of the proportional difference in the tightening strength are shown in FIG. 4. For example, when the bolt P1 is tightened in the presence of differences in the tightened strength between the opposing bolts P6 and P7 on opposite sides of the diameter line from bolt P1, the tightening force of P1 (which is 10 units of force, for instance) is dispersed along the 4—4 force line between bolts P1 and P6 and along the 6—6 force line between bolts P1 and P7.

Meanwhile, the bolt P6 also forms a tension line with bolt P11 and forms another tension line with bolt P1. As a result, the tightening force of bolt P6 also relates to bolt P11 in addition to bolt P1, with the force dispersion being effected in proportion to the difference in the intensity of the tightening forces exerted by bolts of P1 and P11. In the same manner, there is a relationship with the tightening force of bolts P1 and P2 in the case of the bolt of P7.

In other words, the tightening force exerted by of one tightening bolt is mutually affected by that of all of the other bolts. The drum can be tuned in a perfect manner by listening to the strength or weakness of the sound as various bolts are tightend or loosened.

As shown in FIG. 2, a polygonal shape surface PS of tension is formed at the center of the drum head 12. This avoids concentration of tension at a single point on the drum head, as with conventional drum head bolting arrangements. The elasticity of the beaten drum head is enhanced and a more accurate sound is produced. At the same time, such a disperson of the tension line avoids formation of a "knot line" during drum head vibration, which avoids the increase of a specific vibration mode that will become a noise, thereby making it possible to discharge the sound at the center of the drum head with substantial power.

FIG. 3 shows a plan view of the drum head 13 on the opposite end where a sound wire or snappy 21 is installed. Since the sound wire 21 is arranged along a diametric line of the drum head 13, the response of the sound wire 21 becomes better when the center part of the head 13 is tensely stretched, and better quality sound is produced.

Therefore, the drum head 13 on the opposite end is installed and stretched by an even number of tightening bolts, Q1, Q2, Q3, . . . Q10, as in the conventional technology so that a crossing point Q0 of the tension lines is produced in the neighborhood of the center of the drum head 13.

FIG. 3 shows in dash-dot lines the tension lines where an even number of tightening bolts are employed. As has already been described, since the tightening force of a tightening bolt is applied diametrically between two opposite bolts, it is difficult to determine whether the tightening relationship between the two bolts on a single tension line is balanced.

Figure 5:
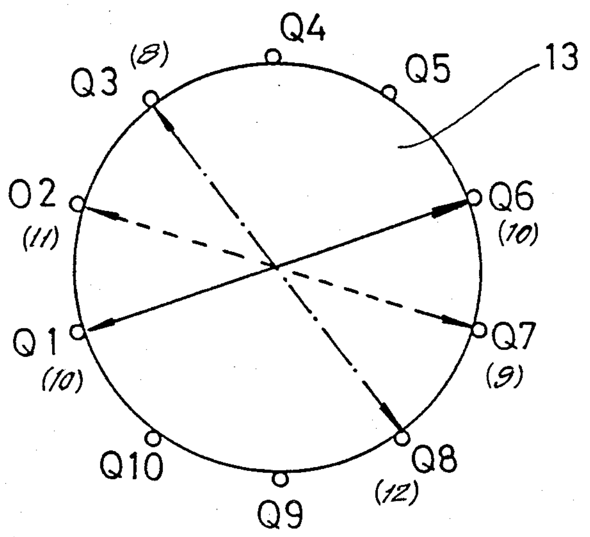
FIG. 5 is a schematic view showing the tension lines where the hoop for the drum head on the reverse side is attached by means of an even number of bolts.

As is shown in FIG. 5, even if the bolts Q1 and Q6 on a single tension line may be balanced, with a force like 10—10, it will still be difficult to obtain a balance among all of the bolts, e.g. as bolts Q2 and Q7 on another tension lines are at forces 11-9 and bolts Q3 and Q8 are at forces 8-12, etc. However, since the drum head on the opposite end is a vibration surface for the sound wire, rather than a drum beating surface, stronger tension at the center of the head center has been given priority over exact tuning.

Regarding the relationship in number between the tightening bolts which pull the hoop for and stretch the beaten drum head and the tightening bolts which pull the hoop for and stretch the drum head on the opposite end, it is desirable from the standpoint of balancing to provide a number of tightening bolts on one drum hoop which is either one more of one less than the number on the other hoop. In addition, the number of the tightening bolts selected depends upon the diameter or the size of the drum. Generally, the number of the tightening bolts for the drum hoop of the beaten drum head is seven, nine or 11.

As has been shown and explained above, the beaten drum head according to this invention is capable of a balanced adjustment for the entire surface of the head, reproducing a more accurate drum sound and is able to produce a powerful sound with the fundamental sound at the center. For the opposite drum head, where a sound wire is installed, the response of the sound wire is fine and the sound produced is satisfactory.

The present invention has been described in connection with a preferred illustrative embodiment thereof. Since many variations and modifications of the present invention will now be obvious to those skilled in the art, it is preferred that the scope of the present invention be determined not by the specific disclosures herein contained but only by the appended claims.

What is claimed is:

1. A drum head securement, comprising:

a drum body having a first end; a beaten drum head for extending over and being attached over the first end of the drum body;

a hoop around the drum body located toward the end of the drum body; means on the beaten drum head for being engaged by the hoop such that when the hoop is moved away from the drum body first end, the beaten drum head is stretched;

the drum body having an odd number of drum hoop attachment means uniformly equally spaced around the drum body; the hoop also having the same number of hoop attachment means as are provided on the drum body and placed so that the attachment means on the hoop may be positioned over the attachment means on the drum body, and a respective connecting means between each attachment means on the drum body and the respective attachment means on the hoop; each connecting means being tightenable for pulling the hoop along the drum body away from the drum body first end for stretching and tightening the beaten drum head; and the locations of the attachment means on the hoop and there being an odd number thereof being selected for tightening the drum head over the drum body and for defining tension lines along the drum head which pass outside the center of the drum head, the tension lines thereby defining a polygonal area.

2. The drum head securement of claim 1, wherein the drum body has a second opposite end, a second drum head over the second end of the drum body and means attaching the second drum head to the drum body.

3. The drum head securement of claim 2, wherein the attachment means for the second drum head comprises a second hoop around the drum body and located toward the second end; second hoop attachment means defined on and uniformly equally spaced around the drum body; the second hoop also having the same number of second hoop attachment means as the second hoop attachment means on the drum body, and a respective second connecting means between each second attachment means on the drum body and respective second attachment means on the second hoop for drawing the second hoop away from the second end of the drum body, for stretching and tightening the second drum head.

4. The drum head securement of claim 3, wherein there are an even number of the second attachment means on the drum body and on the second hoop, wherein the placement of the second attachment means on the drum body and on the second hoop define tension lines across the second drum head which pass through the center of the second drum head.

5. The drum head securement of claim 4, wherein each of the connecting means between each of the respective attachment means on the drum body and the attachment means on the hoop comprise a bolt extending from the attachment means on the drum body and a bolt receptacle on the hoop for receiving the bolt and for tightening the bolt for drawing the hoop toward the attachment means on the drum body.

6. The drum head securement of claim 4, further comprising an additional sound wire attached to the drum body, extending across the outside of the second drum head diametrically across the center thereof.

7. The drum head securement of claim 6, wherein there are a plurality of the additional sound wires in the form of a snappy extending diametrically across the second drum head.

8. The drum head securement of claim 4, wherein there are approximately ten of each of the attachment means on the drum body and on each of the hoops at each of the drum heads.

9. The drum head securement of claim 4, wherein the number of attachment means for the hoop of the beaten drum head is approximately the same number as the attachment means for the hoop of the second drum head.

10. The drum head securement of claim 9, wherein there are a plurality of additional sound wires in the form of a snappy extending diametrically across the second drum head.

11. The drum head securement of claim 2, wherein the number of attachment means for the hoop of the beaten drum head is approximately the same number as the attachment means for the hoop of the second drum head.

* * * * *